April 24, 1934.  W. P. HERMAN  1,956,288
FRUIT JUICE EXTRACTOR
Filed Nov. 11, 1930   2 Sheets-Sheet 1
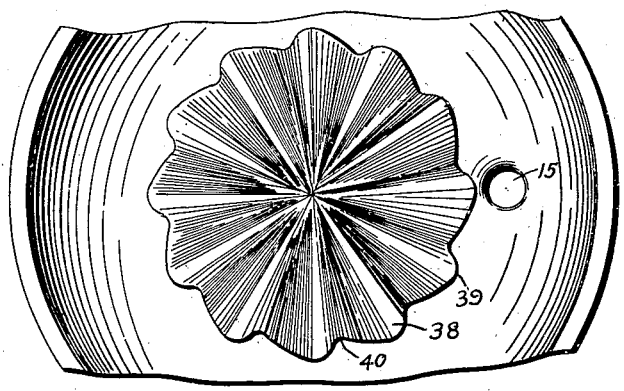
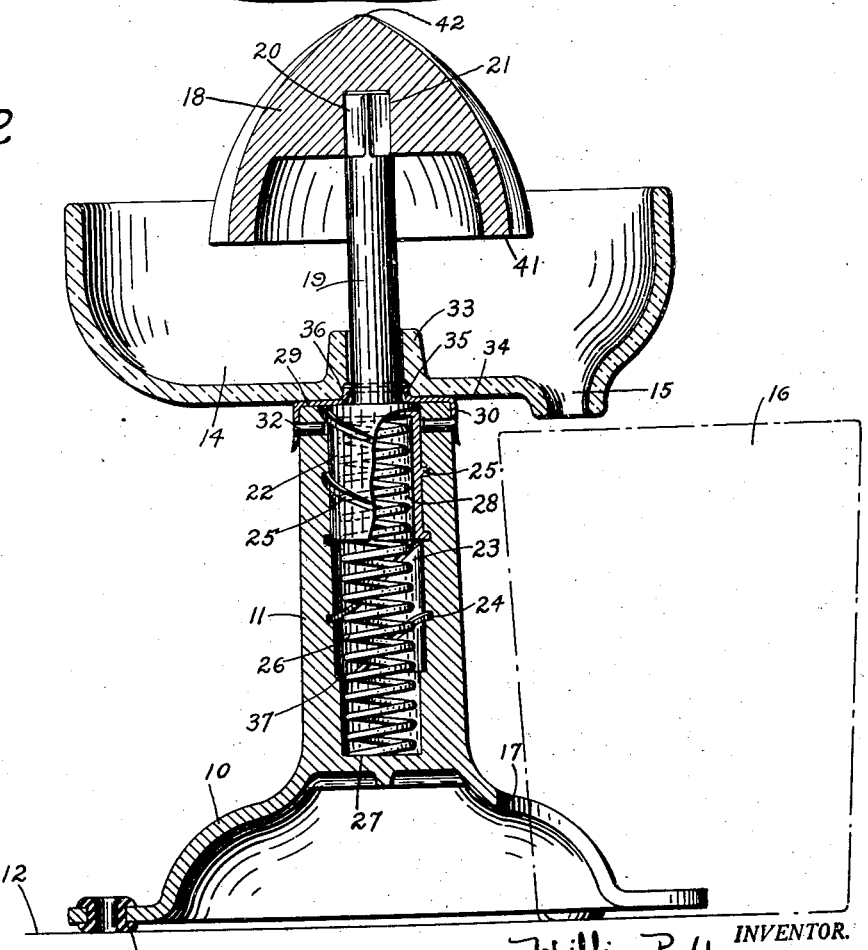

April 24, 1934.   W. P. HERMAN   1,956,288
FRUIT JUICE EXTRACTOR
Filed Nov. 11, 1930   2 Sheets-Sheet 2

INVENTOR.
William P. Herman
BY
ATTORNEY

Patented Apr. 24, 1934

1,956,288

UNITED STATES PATENT OFFICE 1,956,288

FRUIT JUICE EXTRACTOR

William P. Herman, Bridgeport, Conn.

Application November 11, 1930, Serial No. 494,830

2 Claims. (Cl. 146—3)

This invention relates to juice extractors particularly adapted for citrous fruits, tomatoes, etc.

An object of this invention is to provide a juice extractor which is economical to manufacture, convenient to use, and efficient in operation.

The juice extractor of the present invention is of the type generally illustrated in the patent to Enssle No. 1,634,774, granted July 5, 1927, in which the extractor head is mounted for longitudinal movement, and is adapted to be rotated as an incident to the longitudinal movement when pressure is brought to bear on the extractor head through the medium of a piece of fruit held in the hand of the user, the juice being collected by a bowl from which it can flow directly into a tumbler or glass for use.

The objects of this invention have been attained largely by the provision of improvements on the structure shown in the Enssle patent above-named, among which improvements is the provision of a base and extractor head stem which may be formed by die casting, and which, consequently, may be made at comparatively low cost since practically no machining of the parts is required.

Another and extremely important feature of this invention is the provision of an improved extractor head. Heretofore, extractor heads for fruit juice extractors of the type shown, as well as of other types, were all characterized by the provision of relatively sharp edges intended to cut into the cells of the fruit containing the juice, and thus liberate the juice.

According to the present invention, however, ribs or burrs on the extractor head are not sharp but are relatively blunt so as to avoid tearing or shredding of the pulp of the fruit, but rather to break the juice cells by pressure and squeezing action. This provision of blunt ridges or projections on the extractor head has two important advantages, first, by not shredding the pulp remains with the skin of the fruit, and hence is not free to fall into the catch bowl and tumbler with the juice; and second, by having the ribs relatively blunt, less work is required on the part of the operator to extract the juice from a piece of fruit for the extracting operation is more gentle and gradual than with an extractor head having sharp ribs or burrs.

Other features and advantages will hereinafter appear.

In the accompanying drawings which illustrate one form of this invention, that at present preferred:

Figure 1 is a plan view showing the extractor head, and portion of the catch bowl.

Fig. 2 is a vertical section taken through the juice extractor, showing in dot-and-dash lines the tumbler or glass into which the juice may pass.

Figure 3:
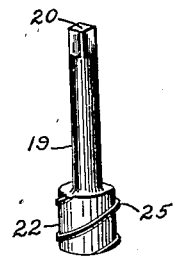
Fig. 3 is a perspective view of the extractor head stem.
Figure 4:
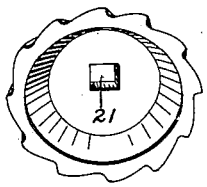
Fig. 4 is a perspective view looking at the bottom of the extractor head.
Figure 5:
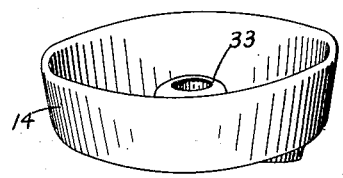
Fig. 5 is a perspective view of the catch bowl looking at it from the top.
Figure 6:
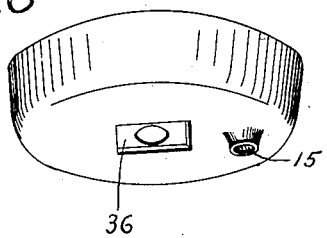
Fig. 6 is a perspective view of the bowl looking at it from the bottom.

As shown in the accompanying drawings, the device of the present invention comprises a base 10 having a standard or post 11 rising from the center thereof to a point substantially above the surface 12 of a table or the like on which the base is supported. The base may have resilient or other feet 13 so that the surface 12 is not marred by direct contact with the base.

At its upper end, the post or pedestal 11 supports a bowl 14 for catching the juice extracted, and this bowl has an outlet orifice 15 through which the juice collected by the bowl may flow into a tumbler or glass 16. To permit the glass 16 to be placed under the outlet 15, and yet allow the latter to be located within the outer dimensions of the bowl, the base 10 is provided with a cut-out portion 17 to receive the tumbler 16 and locate it in proper position below the outlet 15 without requiring any special care on the part of the user in doing so.

In connection with the feature of my invention disclosed herein, and just above described, attention is called to my co-pending application, Serial No. 487,845, filed October 10, 1930, and the application of Fred Enssle, Serial No. 484,954, filed September 29, 1930, in which application the pedestal-mounted catch bowl is described and claimed.

To reduce the weight of the pedestal and base 10, the latter may be made hollow, as shown in the drawings.

The device of the present invention also comprises an extractor head 18, the formation of which will be described below. Suffice here to say that the extractor head 18 is substantially hemi-ovoid in shape to engage one-half of an orange, lemon or the like to liberate the juice contained therein. The extractor head 18 may be made of metal, but it is preferably made of glass or ceramic material, and is removably carried by a stem 19 having a non-circular end 20 fitting a non-circular hole 21 in the extractor head. At its lower end, the stem 19 has a cylindrical enlargement constituting a bearing 22 mounted to move vertically in a cylindrical hole or bore 23 in the pedestal 11.

So that the stem 19 and extractor head 18 may be caused to rotate while it moves vertically relative to the pedestal 11 and base 10, the bore 23 of the pedestal is provided with helical grooves 24, and the bearing 22 on the stem is provided with helical ribs 25 engaging the grooves 24. Thus, when pressure is brought to bear on the extractor head 18 by means of a piece of fruit held in the hand of the user, the bearing 22 descends in the bore 23 and rotates with relation thereto, thus causing the extractor head to rotate within the piece of fruit and break down the walls of the juice cells to liberate the juice as a result of such pressure and rotating movement.

The extractor head and stem are held in elevated position shown in Fig. 2 by a spring 26, the lower end of which rests on a wall 27 at the junction of the base 10 and pedestal 11 and has its upper end engaging and guided by the bearing 22 which has a hollow recess or bore 28 to receive the upper end of the spring. When the extractor head 18 and stem 19 move downwardly, the spring 26 is compressed and when the pressure on the extractor head is relieved sufficiently, the spring forces the stem and extractor head upwardly while they rotate in the opposite direction.

Figure 7:
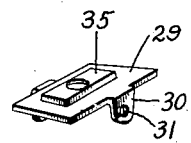
Fig. 7 is a perspective view of the cover plate for the base.
Figure 8:
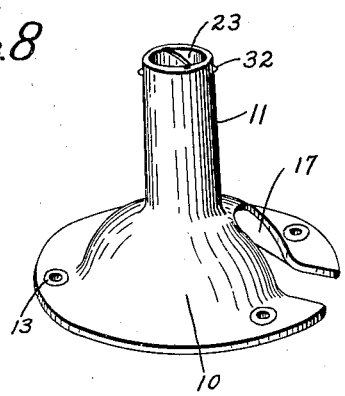
Fig. 8 is a perspective view of the base.
Figure 9:
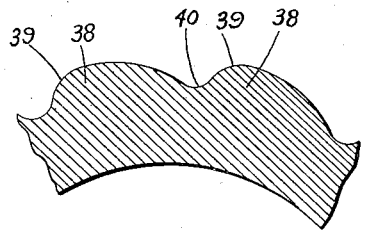
Fig. 9 is a detailed view showing the configuration of the ribs on the extractor head on an enlarged scale.

The upper end of the pedestal 11 is closed by a plate 29, see Fig. 7, which has a pair of depending ears 30 having apertures 31 to receive pins 32 driven in holes in the pedestal 11. The lower ends of the ears 30 may be bevelled off as shown, or may be bent out so that when the plate 29 is forced downwardly, the ears 30 will be cammed out by the pins and then snap over the pins when the apertures 31 are reached. Or, the plate 29 may be formed with the ears bent out slightly and these may be pressed in so that the pins 32 enter the apertures by a suitable tool. The plate 29 in covering the upper end 11 of the pedestal also forms a stop for the bearing portion 22 and determines the normal elevated position of the extractor head 18 and stem 19.

As shown, the catch bowl 14 has a central upwardly extending post 33 through which the stem 19 freely passes, the post 33 being provided merely to prevent the juice collected by the bowl from entering the interior of the pedestal 11. Accordingly, the post 33 is made high enough for this purpose, but not so high as to be struck by the extractor head when the latter reaches the limit of its downward movement.

The bottom portion 34 of the bowl rests on the plate 29 which, in addition to serving the functions above enumerated, is provided with a non-circular upwardly extending plug portion 35 adapted to fit a correspondingly shaped socket 36 on the bottom 34 of the bowl so as to hold the bowl against turning on the pedestal and locate the outlet 15 of the bowl directly over the notch or cut-out portion 17 of the base. In this way, the bowl 14 may be removably supported on the pedestal so that it may merely be lifted off after the extractor head has been removed to be cleaned or to be replaced by another bowl. The tubular post 33 on the bowl has its opening large enough to permit the non-circular or square head 21 on the stem 19 to pass therethrough.

The downward movement of the bearing 22 and thus the extractor stem 19 and head 18 is limited by a shoulder 37 on the interior of the pedestal 11 which directly engages the end of the bearing portion 22. This shoulder 37 also serves to guide and hold centralized the lower end of the spring 26.

As will be apparent from the drawings, the extractor stem 19 and the bearing portion 22 with its helical ribs 25 may be made integral, see Fig. 3, and the same is true of the pedestal with its helical grooves 24, the stop shoulder 37 and the base 10. These parts may be made of die casting, requiring no machine operations after being cast, and in this way a considerable reduction in the cost of the device is effected, both as to material and labor. In assembling the device, it is merely necessary to drop the spring 26 in the hollow pedestal 11, then screw the extractor head stem 19 with its bearing 22 into the hollow pedestal, slide the plate 29 over the end of the extractor stem 19 and force it down so that the pins 32 extend through the apertures 31, then place the bowl 14 on the plate 29 so that its rectangular socket 36 extends over the rectangular plug 35 on the plate 39 and finally place the extractor head with its non-circular hole 21 over the non-circular end 20 of the stem 19.

As stated above, an extremely important feature of the present invention is the provision of a new and improved extractor head which is gentle in its operation, and which makes the extractor head easier to operate, and which does not shred the pulp of the piece of fruit. This is accomplished in the form of the invention herein shown, by providing the extractor head 18 with ribs 38, which have rounded outer extremities or breasts 39 instead of sharp ones as heretofore proposed. These ribs 38 are radially disposed when the extractor head is viewed from the top, and have between them lands 40. The ribs decrease in width from the lower end 41 to the apex 42 of the extractor head at which point they merge into each other.

In addition to this, the elevation of the rounded breast 39 of the ribs 38 above the lands 40 decreases from the bottom portion 41 of the extractor head to the apex 42. Hence at the apex of the extractor head and portions thereof in its immediate vicinity, the extractor head is comparatively smooth, and thus pressure may be applied to the extractor head by the center of the piece of fruit without materially offering resistance to its rotation. If the piece of fruit is cupped in the palm of the hand when applied to the extractor head, the major portion of the pressure on the extractor head will be applied to the apex 42 and in its immediate vicinity. Yet, when the extractor head enters the piece of fruit as the head descends, the lower portions of the ribs 38 which protrude higher above the lands 40 engage the fruit. These portions of the ribs have a powerful rasping effect on those portions of the fruit which are not pressed so firmly against the extractor head, and which do not transmit the force thereto which causes it to rotate and descend.

As the extractor head revolves, the rounded breasts 39 of the ribs squeezes the juice cells and causes them to break by rubbing action rather than by a tearing action, and thus liberated the juice may flow down the sides of the extractor head through the lands 40, or off the piece of fruit into the catch bowl 14.

The extractor head of the present invention has been found extremely efficient in operation both with watery or juicy fruits, and with those specimens of similar fruits which are comparatively dry and do not contain as much juice.

In practical use, of course, the piece of fruit is pressed down as often as is necessary to remove the juice, and while due to the gentle operation of the extractor head of the present invention it might be necessary to employ a greater number of reciprocations to complete the juice extracting operation, each reciprocation requires less effort, the operation may be more quickly and easily accomplished.

Variations and modifications may be made within the scope of this invention, and portions of the improvements may be used without others.

Having thus described the invention, what is claimed as new and for which it is desired to obtain Letters Patent, is:—

1. A fruit juice extractor having a base, a hollow pedestal supported thereon, an extractor head, a stem supporting the latter, a bearing portion on the stem slidingly fitting the internal wall of the hollow pedestal, cooperating threads and grooves on the bearing portion and internal wall of the pedestal for causing the stem to be rotated when downward pressure is brought to bear thereon, the bearing portion being hollow, a coil spring having its lower end resting on the end wall of the hollow pedestal and its upper end located within the hollow bearing portion for moving the bearing portion, stem and extractor head upwardly, a plate closing the upper end of the hollow pedestal for engaging the bearing portion to limit the upward movement of the stem, and means on the plate for supporting a catch bowl and holding the same in predetermined position on the pedestal.

2. A fruit juice extractor having a base, a hollow pedestal supported thereon, an extractor head, a stem supporting the latter, a bearing portion on the stem slidingly fitting the internal wall of the hollow pedestal, cooperating threads and grooves on the bearing portion and internal walls; a plate closing the upper end of the hollow pedestal for engaging the bearing portion to limit the upward movement of the stem, a bowl for catching the juices liberated by operation of the extractor head, said bowl having a discharge orifice; and cooperating means on the catch bowl and said plate for supporting the former on the latter and locating the orifice in predetermined position with relation to the base.

WILLIAM P. HERMAN.